United States Patent
Dotzler et al.

(10) Patent No.: US 8,934,931 B2
(45) Date of Patent: Jan. 13, 2015

(54) APPARATUS AND METHOD FOR ALLOCATING RESOURCES TO NODES IN A COMMUNICATION SYSTEM USING AN UPDATE OF ITERATION RESOURCE WEIGHTS

(75) Inventors: Andreas Dotzler, Munich (DE); Maximilian Riemensberger, Eching (DE); Wolfgang Utschick, Ingolstadt (DE); Guido Dietl, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 324 days.

(21) Appl. No.: 13/297,579

(22) Filed: Nov. 16, 2011

(65) Prior Publication Data

US 2012/0122505 A1    May 17, 2012

(30) Foreign Application Priority Data

Nov. 17, 2010   (EP) .................................... 10191589

(51) Int. Cl.
*H04B 7/00* (2006.01)
*H04M 1/00* (2006.01)
*H04W 72/00* (2009.01)
*H04L 5/00* (2006.01)
*H04W 28/16* (2009.01)
*H04B 7/02* (2006.01)
*H04W 16/22* (2009.01)

(52) U.S. Cl.
CPC .............. *H04W 28/16* (2013.01); *H04B 7/024* (2013.01); *H04L 5/0075* (2013.01); *H04W 16/22* (2013.01); *H04L 5/0064* (2013.01); *H04L 5/003* (2013.01)
USPC ......... 455/509; 455/452.2; 455/450; 455/507

(58) Field of Classification Search
CPC ........................................................ H04Q 7/32
USPC ......................... 455/509, 513, 514, 515, 450
See application file for complete search history.

(56) References Cited

U.S. PATENT DOCUMENTS 6,393,012 B1    5/2002  Pankaj
7,142,864 B2 *  11/2006 Laroia et al. ................. 455/450
7,539,660 B2 *  5/2009  Focazio et al. ...................... 1/1

(Continued)

FOREIGN PATENT DOCUMENTS

CN    1375948 A    10/2002
CN    101026445 A   8/2007

(Continued)

OTHER PUBLICATIONS

Chiang, Mung et al., "Layering as Optimization Decomposition: A Mathematical Theory of Network Architectures," Proceedings of the IEEE, vol. 95, No. 1, Jan. 2007, pp. 255-312.

(Continued)

*Primary Examiner* — Tilahun B Gesesse
(74) *Attorney, Agent, or Firm* — Brinks Gilson & Lione

(57) ABSTRACT

An apparatus for allocating resources to nodes in a communication system comprises an iteration controller (10) for performing an iterative processing, the iteration controller being configured for using (11) iteration resource weights to obtain a resources allocation result for an iteration step, and for updating (12) the iteration resource weights to obtain updated iteration resource weights for a further iteration step using a weighted combination of the resources allocation results for the iteration step and for at least one earlier iteration step.

14 Claims, 15 Drawing Sheets

(56) References Cited

U.S. PATENT DOCUMENTS

| | | | |
|---|---|---|---|
| 7,639,660 | B2 | 12/2009 | Kim et al. |
| 8,174,959 | B2 * | 5/2012 | Yang et al. ............... 370/208 |
| 8,200,266 | B2 | 6/2012 | Larsson et al. |
| 2002/0194555 | A1 | 12/2002 | Gueguen |
| 2003/0064753 | A1 | 4/2003 | Kasapi et al. |
| 2005/0181799 | A1 * | 8/2005 | Laroia et al. ............. 455/450 |
| 2009/0232074 | A1 * | 9/2009 | Yang et al. ............... 370/329 |
| 2009/0305716 | A1 * | 12/2009 | Ono .......................... 455/452.2 |
| 2010/0197331 | A1 | 8/2010 | Larsson et al. |

FOREIGN PATENT DOCUMENTS

| | | |
|---|---|---|
| CN | 101511125 A | 8/2009 |
| EP | 1737176 A1 | 12/2006 |
| EP | 1742497 A1 | 1/2007 |
| EP | 2 096 805 A1 | 9/2009 |
| JP | 2009-219114 A | 9/2009 |
| JP | 2010-532624 A | 10/2010 |
| KR | 10-0928459 B1 | 11/2009 |
| RU | 2368104 C2 | 9/2009 |
| WO | WO 2007/128710 A1 | 11/2007 |
| WO | WO 2009/005421 A1 | 1/2009 |

OTHER PUBLICATIONS

Extended European Search Report for European Application No. 10191589.0, dated May 18, 2011, 10 pages.

Hodgskiss, Joe et al., "Accelerating a Dual Algorithm for the Simultaneous Routing and Power Control Problem", *The 18th Annual IEEE International Symposium on Personal, Indoor and Mobile Radio Communications (PIMRC '07)*, 2007, 5 pages.

Kelley, Jr., J.E., "The Cutting-Plane Method for Solving Convex Programs", *Journal of the Society for Industrial and Applied Mathematics*, vol. 8, No. 4, Dec. 1960, pp. 703-712.

Shor, N.Z., "Convergence Rate of the Gradient Descent Method with Dilatation of the Space", Consultants Bureau, Plenum Publishing Corporation, 1973, pp. 102-108.

Venturino, Luca et al., "A Successive Convex Approximation Algorithm for Weighted Sum-Rate Maximation in Downlink OFDMA Networks," 42nd Annual Conference on Information Sciences and Systems (CISS), IEEE, Mar. 2008, pp. 379-384.

Weeraddana, Chathuranga et al., "Weighted Sum-Rate Maximization for Downlink OFDMA Systems," 42nd Asilomar Conference on Signals, Systems and Computers, IEEE, Oct. 2008, pp. 990-994.

Yu, David D. et al., "Iterative Water-filling for Optimal Resource Allocation in OFDM Multiple-Access and Broadcast Channels," IEEE Global Telecommunications Conference, Dec. 2006, 5 pages.

Office Action from counterpart Japanese Application No. 2011-250723, dated Feb. 5, 2013, 5 pages (with translation).

Notice of Allowance from South Korean Application No. 10-2011-0118939, dated Mar. 24, 2014, 3 pages.

Office action from Chinese Application No. 201110364557.X, dated Nov. 19, 2013, 11 pages (with English translation).

\* cited by examiner

Weighted Sum-Rate Maximization (WSRMax) can be used to find a point on the boundary of $R$.

Iteration 3, from
$\lambda^{3T} r^3 = K$ (number of users)
follows
$r^3 = r^*$

```
i=1
Initialize λᵢ
while not converged do
    rᵢ* = argmax {U(r) - λᵢᵀr}
           r≥0
    cᵢ* = argmax {λᵢᵀc}
           c∈R
    d(λᵢ) = U(rᵢ*) - λᵢᵀ(rᵢ* - cᵢ*)
    Dual variable update, use d(λᵢ), rᵢ*, cᵢ* to calculate λᵢ₊₁
    i = i+1
    Covergence check
end
```

Primal-Dual Algorithm

FIGURE 5

```
i=1
Initialize λᵢ
while D > ε do
    cᵢ* = argmax {λᵢᵀc}
           c∈R
    Dual variable update: compute α* and λᵢ₊₁,ₖ (∑ᵢₘ₌₁ αₘ*eₖᵀcₘ*)⁻¹
    i = i+1
    Covergence check: D = λᵢᵀcᵢ* - K;
end
```

Primal-Dual Algorithm with Update Rule

FIGURE 6

| method | update rule | complexity update | convergence speed |
|---|---|---|---|
| subgradient | closed form | low | poor |
| ellipsoid | closed form | low | good for low accurany, extremly poor for high accurancy |
| cutting plane | linear program, K+1 variables, i constraints | reasonable | poor for low accurany, good for high accurancy |
| multi-cut | linear program, 2K+1 variables, (K+1)i constraints | high | very fast |
| Aitkens | closed form | low | stability issues |
| our method | convex program, i variables, 1 constraint | reasonable | superior |

FIGURE 8

APPARATUS AND METHOD FOR ALLOCATING RESOURCES TO NODES IN A COMMUNICATION SYSTEM USING AN UPDATE OF ITERATION RESOURCE WEIGHTS

RELATED APPLICATIONS

This application claims priority under 35 U.S.C. §119 to European Patent Application No. 10191589.0 filed on Nov. 17, 2010, the entire content of which is hereby incorporated by reference.

BACKGROUND OF THE INVENTION

The present invention is related to wireless communication and, particularly, to the task of resource allocation for transmitter/receiver nodes in a wireless network.

Reference is made to the problem of finding an efficient proportional fair rate assignment, denoted by the vector of transmission rates $r=[r_1, \ldots, r_K]^T \epsilon R_+^K$, for the set of users K, in the coverage area of the network.

$$\underset{r}{\text{maximize}} \sum_{k \in K} \log r_k$$

$$\text{subject to } r \in R$$

The rate assignment for the users in the network is illustrated in FIG. 2. The interdependence of the user rates is described by an achievable rate region R, which is assumed to be a convex set. The rate region R is constituted by the physical layer techniques, for example MIMO transmission, and the channel realizations. It is well known that this problem can be solved by dual decomposition, [1]. The dual problem can be solved by a primal-dual algorithm, as described in the Algorithm illustrated in FIG. 5.

In order to allow for real time implementation of the algorithm its convergence speed and complexity is a main issue. The computational complexity of the Algorithm is dominated by the complexity to solve the Weighted Sum-Rate optimization $$c^*_i = \text{argmax}_{c \in R}\{\lambda_i^T c\},$$

carried out in each iteration. Additionally when users in a network with more than one base station are coordinated each iteration causes signalling overhead among the base stations. As the complexity for solving the Weighted Sum-Rate optimization is constant for each iteration a main issue is to reduce the number of iterations necessitated to find the solution, or a rate configuration that is provable within a factor $\epsilon$ of the solution. The number of iterations needed depends on the update method for the dual variables and most frequently used methods for the update of the dual variables are Subgradient Methods, are the most popular update rules, see for example, as they have a simple closed form expression for the update, $$\lambda_{i+1} = \left[\lambda_i + \frac{\tau}{i}(r_i^* - c_i^*)\right]^+.$$

The drawback of subgradient methods however is the poor convergence, especially in case high accuracy is necessitated.

Cutting Plane Methods, build on the fact that the dual function is convex and can therefore be lower bounded by hyperplanes. Iteratively hyperplanes are used to cut off halfspaces of points from the candidate points until the solution is found.

Ellipsoid Method [2] use Ellipsoids that contain the candidate points. Iteratively the Ellipsoid is cut into two half-ellipsoids and one is discarded. As an update the center of a new ellipsoids containing the remaining half ellipsoid is used. The new center $\lambda i+1$ is calculated by $$g = \frac{(r_i^* - c_i^*)}{\sqrt{(r_i^* - c_i^*)^T A_i^{-1}(r_i^* - c_i^*)}}$$

$$\lambda_{i+1} = \left[\lambda_i + \frac{1}{K+1}A_i^{-1}g\right]^+$$

$$A_{i+1}^{-1} = \frac{K^2}{K^2-1}\left(A_i^{-1} - \frac{2}{k+1}A_i^{-1}gg^T A_i^{-1}\right)$$

Kelley's Cutting Plane Method [3], approximates the dual function by hyperplanes and uses the minimizer of the linear approximation as an update. The new dual variables are the solution of the following optimization problem $$\underset{\lambda,z}{\text{maximize}} z$$

$$\text{subject to } z \geq d(\lambda_j) - \lambda(r_j^* - c_j^*) \forall\ j = 0, \ldots, i$$

$$\lambda \geq 0.$$

Various variants of adding hyperplanes to the linear approximation exist. Additionally, a method is considered, which is named Multi-Cut, where one hyperplane per user is added in each iteration. The Multi-Cut method drastically improves the convergence speed, however the costs for the dual update increases largely in each iteration.

Aitken's method [4] adds an acceleration mode to subgradient methods, resulting in faster convergence, however stability of the algorithm becomes an issue. The update rule calculates one subgradient step, thereby finding an intermediate dual vector $$\tilde{\lambda} = \left[\lambda_i + \frac{\tau}{i}(r_i^* - c_i^*)\right]^+.$$

With the intermediate dual vector one can compute $$\tilde{r} = \text{argmax}_{r \geq 0}\{U(r) - \tilde{\lambda}^T r\},$$

and $$\tilde{c} = \text{argmax}_{c \in R}\{\tilde{\lambda}^T c\}$$

to obtain a further sub-gradient step $$\hat{\lambda} = \left[\tilde{\lambda} + \frac{\tau}{i}(\tilde{r} - \tilde{c})\right]^+.$$

Finally, use $\tilde{\lambda}$ and $\hat{\lambda}$ to compute $$\lambda_{i+1,k} = \lambda_k - \frac{(\tilde{\lambda}_k - \lambda_k)^2}{\hat{\lambda}_k - 2\tilde{\lambda}_k + \lambda_k}.$$

One can observe that convergence speed is improved when more computational complexity is invested for the dual update. Some methods have closed form expressions for the update, while others necessitate to solve an optimization problem. The complexity and the convergence speed is summarized in FIG. 8.

As one can see, the state-of-the-art methods have either high complexity to calculate the dual update or suffer from poor convergence which again is computationally complex, due to the large number of Weighted Sum-Rate problems that need to be solved.

U.S. 2009/232074 A1 discloses an auction-based resource allocation in wireless systems. Systems and methods to assign one or more resources in a multi-user cellular Orthogonal Frequency-Division Multiple Access (OFDMA) uplink include specifying a resource allocation problem for one or more resources; converting the resource allocation problem into an assignment problem; solving the assignment problem through an auction; and allocating one or more resources to cellular users to maximize a system utility.

SUMMARY OF THE INVENTION

According to an embodiment, an apparatus for allocating resources to nodes in a communication system may have: an iteration controller for performing an iterative processing, characterized in that the iteration controller being configured: for using iteration resource weights to obtain a resources allocation result for an iteration step, and for updating the iteration resource weights to obtain updated iteration resource weights for a further iteration step using a weighted combination of the resources allocation results for the iteration step and for at least one earlier iteration step.

According to another embodiment, a communication system may have: an inventive apparatus for allocating resources; nodes being mobile terminals; and base stations, wherein the mobile terminals or the base stations have multiple antennas to implement spatial channels.

According to another embodiment, a method for allocating resources to nodes in a communication system may have the steps of: performing an iterative processing using a plurality of successive iteration steps; characterized by, within an iteration step, using iteration resource weights to obtain a resources allocation result for the iteration step, and within the iteration step, updating the iteration resource weights to obtain updated iteration resource weights for a further iteration step in the plurality of successive iteration steps using a weighted combination of the resources allocation results for the iteration step and for at least one earlier iteration step.

Another embodiment may have a computer program for performing, when running on a computer or processor, the inventive method for allocating resources to nodes in a communication system.

The present invention is based on the finding that a much higher convergence speed of the iterative process is obtained when the update step of the iteration resource weights is performed using a weighted combination of the resource allocation results for this iteration step and for at least one earlier iteration step. All earlier resources allocation results are combined for calculating the updated iteration resource weights necessitated in a Primal-Dual algorithm.

Specifically, the update of the Dual variables $\lambda_k$ is performed as a weighted combination of the earlier resources allocation results, where each earlier allocation result has an associated weighting factor. The weighting factor is a solution to a further optimization problem in that the sum of the weights for weighting the earlier iteration result is equal to 1.

The resources allocation result for the iteration step is determined based on an optimization of the weighted sum of the individual resources, where the iteration resource weights $\lambda$ are the weights for the individual resources, and where the optimization is performed using an optimization target and the resource region. The resource region is defined by a condition of the communication system or the nodes. In an embodiment, the condition of the communication system or the nodes comprises a transmission channel between a node and a receiver or inner characteristics of the nodes, transmission power constraints of the nodes, mutual interference between the nodes, physical layer constraints or transmission protocols. The resources allocated through the nodes are transmission rates, frequency channels, time slots, code slots or spatial channels.

The iteration controller is configured for calculating, in an iteration step, a new combination weight $\alpha$ based on an optimization of a weighted sum of the resources allocation result of an earlier iteration step multiplied by a combination weight of the earlier iteration step and the resources allocation result of a current iteration step multiplied by the new combination weight, under the condition that the combination of the new combination weight and the combination weight of at least one earlier iteration step is equal to the predefined constraint value.

The apparatus comprises a memory for storing the resources allocation results obtained in earlier iteration steps up to a current iteration step and for storing combination weights for the weighted combination from earlier iteration steps up to the current iteration step.

The apparatus comprises an input interface for receiving information on the resource region defined by a condition of the communication system or nodes and an output interface for outputting the resources allocation result of a final iteration step performed by the iteration controllers so that the nodes are configurable using the resources allocation result of the final iteration step.

The nodes are mobile terminals, and the system comprises base stations, wherein the apparatus for allocating is configured for providing the resources allocation result of the final iteration step to a base station.

Embodiments of the present invention constitute an efficient proportional fair rate assignment for multi-user systems. The invention provides a novel dual update method and apparatus for dual decomposition based algorithms, used to compute an efficient proportional fair rate assignment for multi-user systems. The new concept offers a superior convergence speed compared to existing methods. Contrary to existing methods, embodiments of the present invention strictly improve the performance in each iteration. By causing minor additional costs, the inventive concept drastically reduces the number of iterations needed and, therefore, enables an overall reduction of complexity.

The present invention is useful in the field of wireless communications, in the field of transmission technologies, in the field of coordinated multi-point (CoMP) transmission and when a proportional fair rate assignment is necessitated.

BRIEF DESCRIPTION OF THE DRAWINGS

Embodiments of the present invention will be detailed subsequently referring to the appended drawings, in which:

FIG. 5 illustrates a straightforward primal-dual algorithm;

FIG. 6 illustrates an inventive primal-dual algorithm with the specific update rule;

FIG. 8 illustrates a table summarizing different characteristics of conventional methods compared to the inventive concept.

DETAILED DESCRIPTION OF THE PREFERRED EMBODIMENTS

Figure 2:
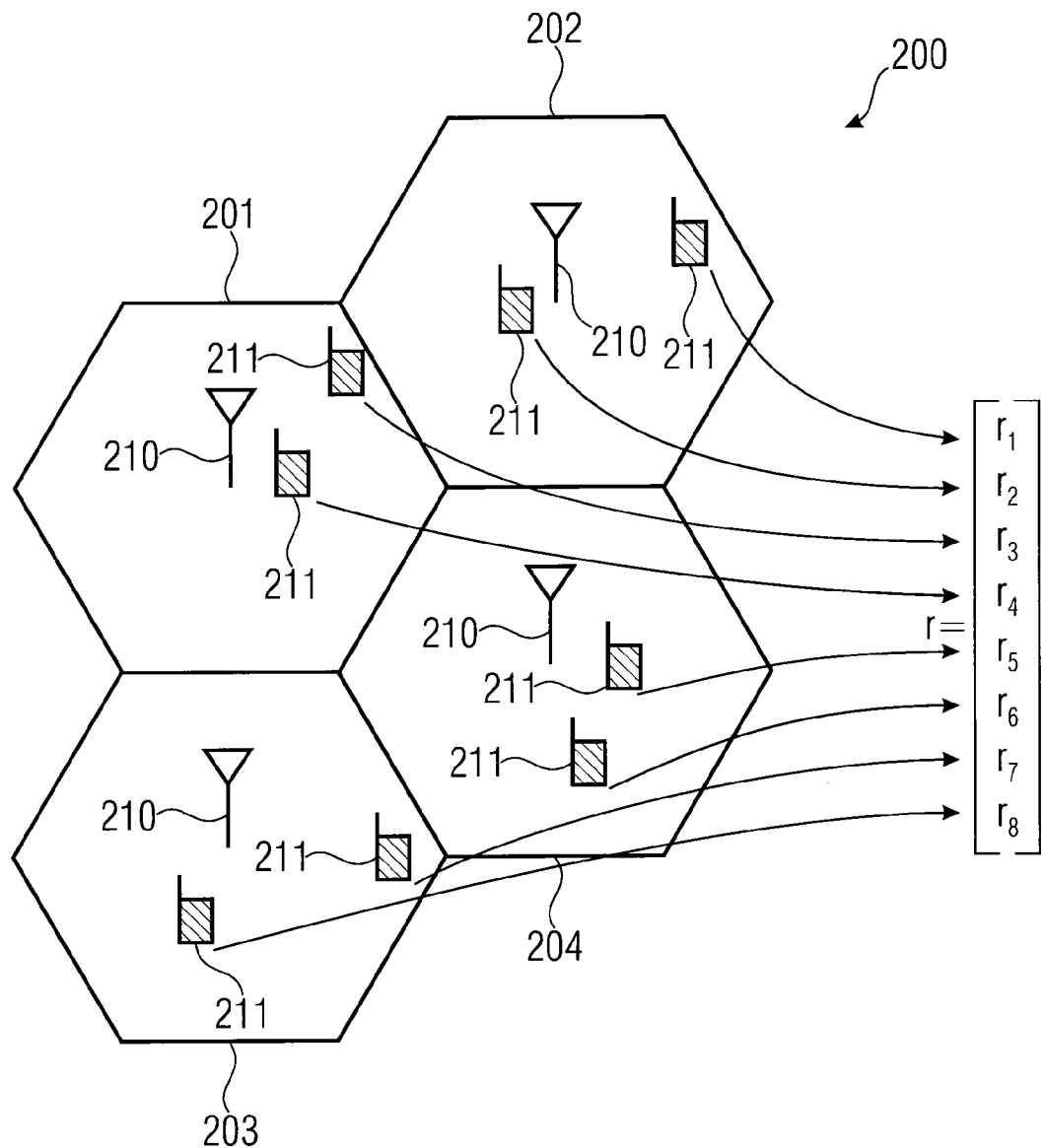
FIG. 2 illustrates a rate assignment for users in a downlink transmission for a multi-user multi-cell/CoMP MIMO system.

FIG. 2 illustrates a problem to which the present invention can be applied. A problem scenario comprises several cells 201, 202, 203, 204, where each cell comprises a base station 210 and several mobile terminals 211. Now, the problem to be solved is that each mobile terminal 211 should receive a certain transmission resource such as a transmission rate, a number of frequency channels, a number and size of time slots, frequency slots, code slots or spatial channels. Specifically, the wireless situation is so that all mobile terminals 211 in a sense influence each other, and this mutual interdependence is typically described by the achievable rate region R which is, for example, assumed to be a convex set, although this is not necessitated for the invention. The rate region R is constituted by the physical layer techniques, for example MIMO transmission and channel realizations. As illustrated in [1], this problem can be solved by the dual decomposition and the dual problem is solved by the primal-dual algorithm as illustrated in FIG. 5. Particularly, a fair rate allocation is necessitated which means that it should be made sure that no user receives a zero resource and that, overall, the resource is maximized. Stated differently, when the user 211 which is in a certain cell should receive a maximum rate then this would mean that other transmitters in the neighborhood of this strong transmitter can only have a small rate, but the total overall rate could be higher when both transmitters obtain a quite similar rate. However, this finally depends on the different transmission channels, the physical layer and so on. However, the rates of the users have to be proportionally fair allocated to achieve high throughput, also for cell-edge users and, thus, a high user satisfaction for all users. Since typically no explicit description of the rate region R is available, the iterative algorithm, as illustrated in FIG. 5, is used. In this process, an iteration is performed, in which a solution of the weighted sum rate problem according to the current dual variables (weights) is computed and the dual variables are updated as long as the solution is not optimum.

It has been found that the computational complexity of the dual variable update in conventional methods is too high and that many iterations are necessitated, leading to a high overall computational complexity where the main complexity lies in solving the weighted sum rate problem and in case of cooperation between cells, a high signaling overhead is necessitated.

In accordance with the present invention, the update rule for dual variables is enhanced in that for updating the iteration resource weights the iteration resource weights $\lambda_{i+1}$ are updated using a weighted combination of the resource allocation results for the current iteration step and for at least one earlier iteration step. Approximations of the rate regions are iteratively improved and used for updating the dual variables (weights of the rate distribution among users). The new update rule has a small computational complexity and leads to a high convergence speed. Therefore, the new concept has a reduced overall complexity. This is summarized in the last line of FIG. 8.

Figure 7:
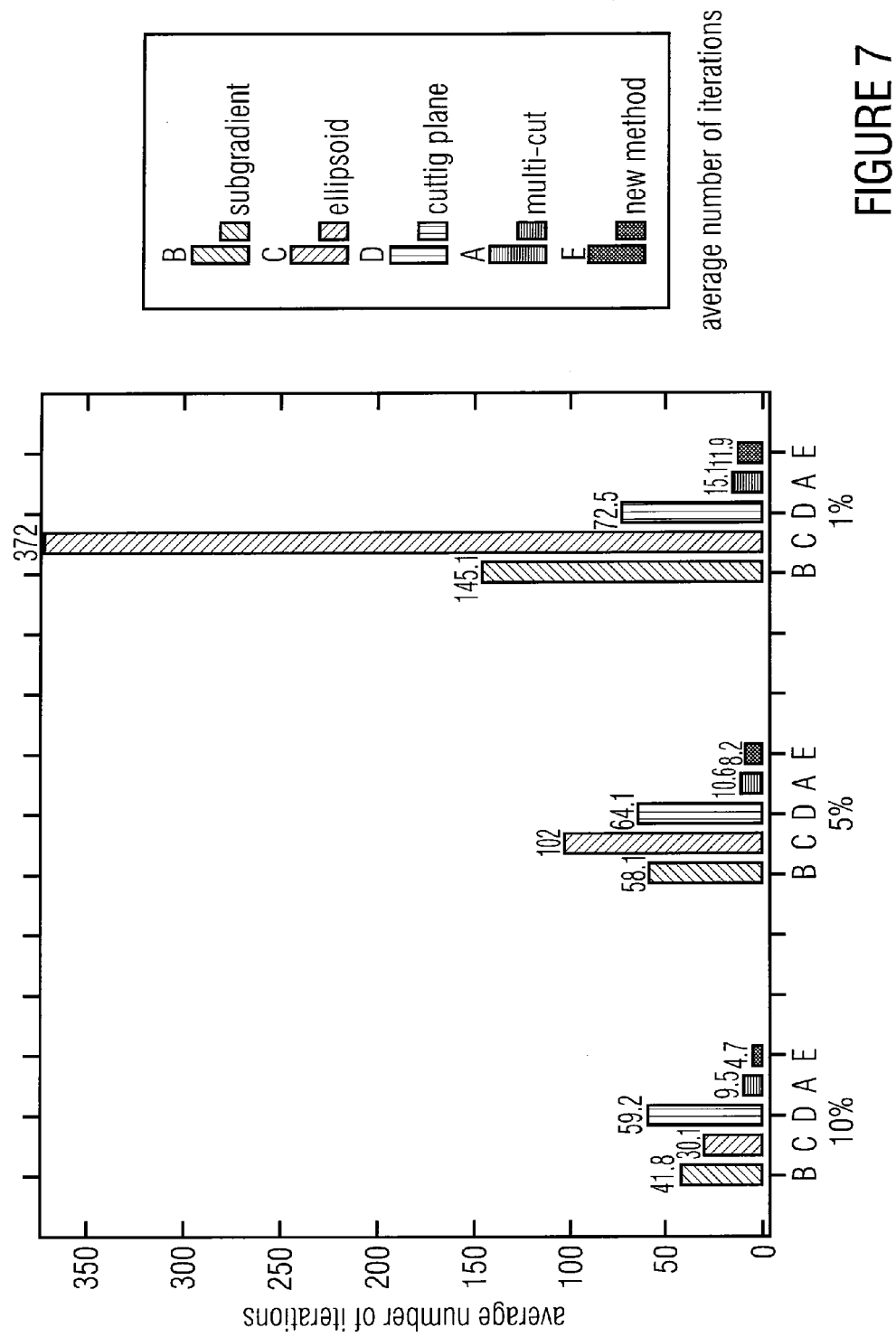
FIG. 7 illustrates the performance of the present invention with respect to conventional methods.

For the simulations in FIG. 7, a multicell/CoMP simulation setup is used with 19 sites placed in a hexagonal grid, three sectors per site, an inter-site distance of 500 meters, a wrap-around configuration, a channel model according to 3GPP TR 360.814, urban macro-cell, a four by four MIMO configuration and an average of five users per sector uniformly distributed.

Figure 1:
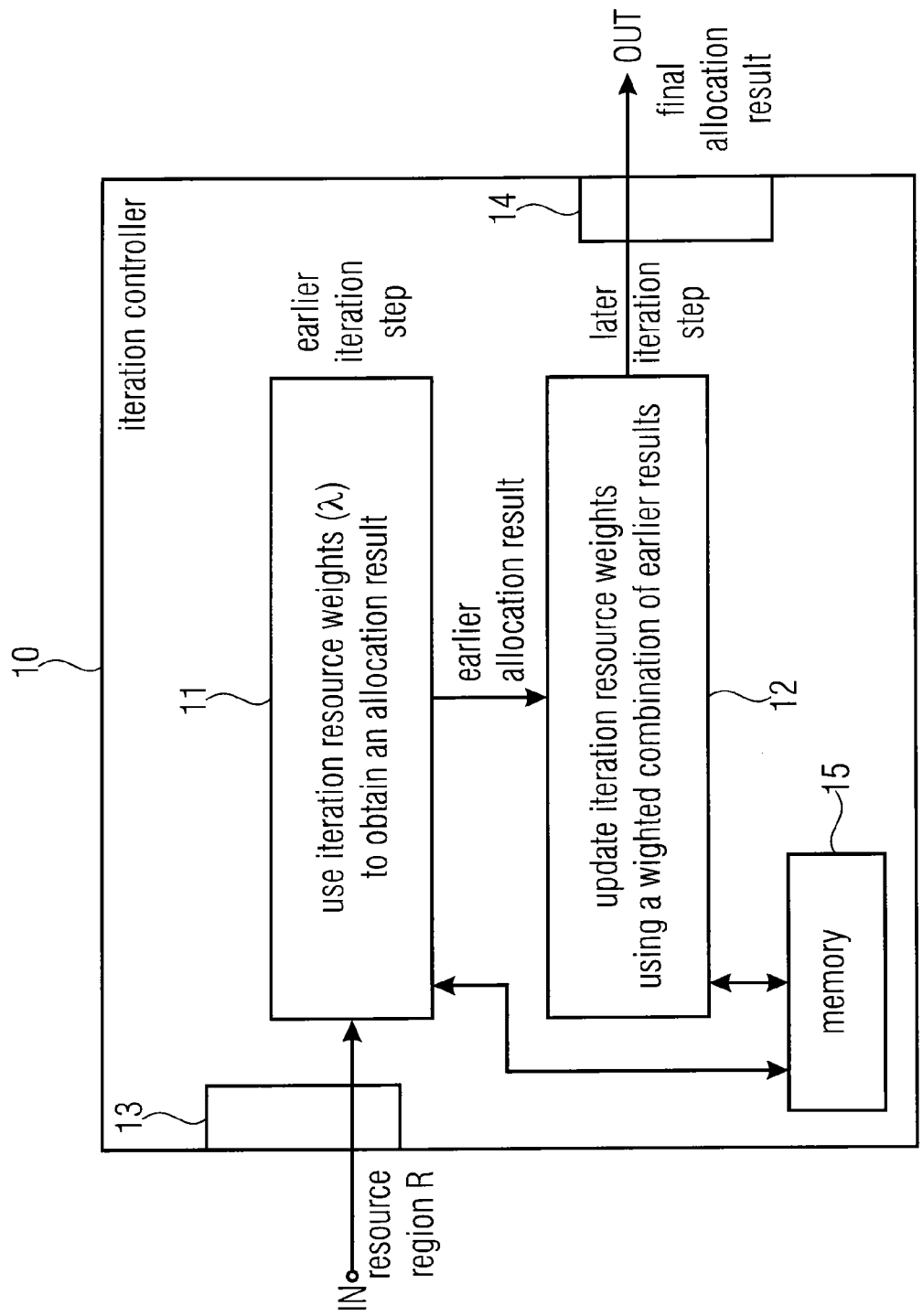
FIG. 1 illustrates an apparatus for a method for allocating resources to nodes in a communication system.

FIG. 1 illustrates an apparatus for allocating resources to nodes 211 in a communication system 200 as illustrated in FIG. 2. The apparatus comprises an iteration controller 10 for performing an iterative processing, the iteration controller being configured as indicated at 11 and 12. Reference number 11 refers to the configuration of the iteration controller in that the iteration controller is configured for using iteration resource weights λ to obtain a resources allocation result r* for an iteration step. Reference number 12 indicates that the iteration controller is furthermore configured for updating the iteration resource weights λ to obtain updated iteration resource weights $\lambda_{i+1}$ for a further iteration step using a weighted combination of the resources allocation results for the current iteration step and for at least one earlier iteration step. Furthermore, the apparatus comprises an input interface 13 for receiving information on the achievable rate region which may, for example, be constituted by physical layer techniques, for example MIMO transmission, and the channel realizations. Furthermore, the apparatus comprises an output interface 14 for providing the final allocation result subsequent to a termination of the iteration process, i.e., when a termination criterion has been fulfilled.

The final allocation result may comprise transmission rates, frequency channels, time slots, code slots or spatial channels. When, for example, a certain minimum bit error rate is necessitated for a certain bit rate, then the transmission power has to be set to a certain value. When, however, the transmission power remains the same, then assigning a higher or lower minimum signal to noise ratio which can, for example, be controlled by different modulation methods having higher or lower constellation diagrams, a rate assignment can also be performed. Therefore, a resource allocation will manifest itself within a transmitter in a certain transmission power setting and/or in a certain selection of a mapping rule (constellation diagram), in a certain amount of forward error correction coding, i.e., that a higher redundancy means a lower transmission rate but an enhanced signal to noise ratio. More complex issues can be included into the rate assignment such as certain available retransmission rules, etc.

Hence, the final allocation result is communicated via the output interface to an individual transmitter in a transmission network or is first transmitted to a base station 210 of FIG. 2 and is then, from the base station, transmitted to the mobile terminal 211 which is associated to this base station.

For the update of the dual variables, the following is proposed $$\lambda_k = \left(\sum_{m=1}^{i} \alpha_m^* e_k^T c_m^*\right)^{-1},$$

where α* is the solution to the following optimization problem:

$$\underset{\alpha \geq 0}{\text{maximize}} \sum_{k \in K} \log\left(\sum_{m=1}^{i} \alpha_m e_k^T c_m^*\right)$$

$$\text{subject to } \sum_{m=1}^{i} \alpha_m = 1.$$

The problem is to maximize a twice differentiable concave function over a simple constraint set, for which very fast and efficient algorithms exist. The Primal-Dual Algorithm with the new update mechanism is summarized in FIG. 6, where one can notice that some steps drop out.

The main contribution of the novel dual update method are:
- superior convergence speed
- guaranteed improvement of the utility in each iteration, no stepsize control needed
- overall reduction of complexity Embodiments comprise a concept for updating dual variables in algorithms aiming at maximizing some utility function in a communications system with multiple users, comprising the solution of a utility maximization program assuming a piece wise linear approximation of the rate region, and further comprising the element wise inversion of the resulting user rates.

The present invention comprises an iterative execution of the dual variable update rule to improve the quality of the piece wise linear approximation of the rate region. The utility function is done in accordance with a proportional fair rate allocation. Furthermore, the invention is applied to a communication system, where the base stations are cooperating and where base stations and mobile nodes have multiple antennas.

Finding an efficient proportional fair rate assignment for a multi-user system is cast by the utility maximization problem $$U_P: \underset{r \geq 0}{\text{maximize}} \sum_{k \in K} \log r_k$$

subject to $r \in R$.

This problem is solved by dual decomposition, where the dual function $d(\lambda)$ is $$d(\lambda) = \underset{r \geq 0, c \in R}{\text{maximize}} \sum_{k \in K} \log r_k - \lambda^T(r - c)$$

$$= \sum_{k \in K} \left(\log \frac{1}{\lambda_k} - 1\right) + \underset{c \in R}{\text{maximize}} \lambda^T c.$$

As $U_P$ is a convex optimization problem, that attains its maximum, the dual problem has the same optimal value $U^*_D = U^*_P$. The dual problem $U_D$ is $$U_D: \underset{\lambda \geq 0}{\text{minimize}} \ d(\lambda),$$

which is equivalent to $$\underset{z, \lambda \geq 0}{\text{minimize}} \ z - \sum_{k \in K} \log \lambda_k - K$$

subject to $\lambda^T c \leq z \ \forall \ c \in R$, as a closed convex set can be characterized as the intersection of closed half-spaces. In general the number of halfspaces needed to fully describe R is infinite which prohibits to solve $U_D$ directly. One can therefore adopt Algorithm 1 and in each iteration one can formulate an alternative problem, $$A_P(i): \underset{z, \lambda \geq 0}{\text{minimize}} \ z - \sum_{k \in K} \log \lambda_k - K$$

subject to $\lambda^T c_m^* \leq z, \ \forall \ m = 0, \ldots, i$.

that works with a finite set of points $\{c^*_0, \ldots, c^*_i\}$, which are obtained from the weighted sum-rate optimization problem $c^*_m = \operatorname{argmax}_{c \in R}\{\lambda_m^T c\}$ solved in each iteration. Clearly the optimum of $A_P$ is a lower bound on the optimum of problem $U_P$, which has less degrees of freedom. In the following it is mathematically proved that iteratively using the optimizers of $A_P$ as update of the dual variables tightens the bound until eventually $A^*_P(i) = U^*_D = U^*_P$, or $D = U^*_P - A^*_P(i) < \epsilon$ which is an $\epsilon$-optimal solution.

Solution to the Approximation Problem

In this section it is discussed how to compute the solution of $A^*_P(i)$, which is a convex optimization problem. The Lagrangian Function is $$L(z, \lambda, \alpha) = z - \sum_{k \in K} \log \lambda_k - K - \sum_{m=1}^{M} \alpha_m(z - \lambda^T c_m^*)$$

$$= \left(1 - \sum_{m=1}^{M} \alpha_m\right) z - \sum_{k \in K} \log \lambda_k - K + \sum_{m=1}^{M} \alpha_m \lambda^T c_m^*.$$

Proposition 1: The dual function $\theta(\alpha)$, which is the minimum of the Lagrangian Function for a given dual variable $\alpha$, is given by $$\theta(\alpha) = \underset{z, \lambda \geq 0}{\text{minimize}} \ L(z, \lambda, \alpha) = \begin{cases} \sum_{k \in K} \log\left(\sum_{m=1}^{i} \alpha_m e_k^T c_m^*\right) & \text{if } \sum_{m=1}^{i} \alpha_m = 1 \\ -\infty & \text{otherwise} \end{cases}$$

Explanation: As z is unconstrained one can make it arbitrary small and therefore $\theta(\alpha) = -\infty$ unless $\Sigma_{m=1}^m \alpha \neq 1$. In this case, $$L(z, \lambda, \alpha) = -\sum_{k \in K} \log \lambda_k - K + \sum_{m=1}^{M} \alpha_m \lambda^T c_m^* \quad (1)$$

and from $$\frac{\partial L}{\partial \lambda_k} = -\frac{1}{\lambda_k} + \sum_{m=1}^{M} \alpha_m e_k^T c_m^* \stackrel{!}{=} 0 \quad (2)$$

follows

-continued $$\lambda_k = \left(\sum_{m=1}^{i} \alpha_m e_k^T c_m^*\right)^{-1}.$$

Plugging this into Equation (1) one can conclude that in case $\sum_{m=1}^{m} \alpha = 1$, $$\theta(\alpha) = -\sum_{k \in K} \log\left(\left(\sum_{m=1}^{M} \alpha_m e_k^T c_m^*\right)^{-1}\right) - K + \sum_{m=1}^{M} \alpha_m \sum_{k \in K} \frac{e_k^T c_m^*}{\sum_{m=1}^{M} \alpha_m e_k^T c_m^*}$$

$$= \sum_{k \in K} \log\left(\sum_{m=1}^{M} \alpha_m e_k^T c_m^*\right).$$

From Proposition 1 one can conclude that the dual problem $A_D(i)$, $$\underset{\alpha \geq 0}{\text{maximize}} \, \theta(\alpha),$$

is equivalent to the following problem $$A_D(i): \underset{\alpha \geq 0}{\text{maximize}} \sum_{k \in K} \log\left(\sum_{m=1}^{i} \alpha_m e_k^T c_m^*\right) \quad (3)$$

$$\text{subject to } \sum_{m=1}^{i} \alpha_m = 1.$$

The problem means to find the convex combination of the rate points, $c_1, \ldots, C_i$, that maximizes the proportional fairness utility. Plugging the solution a* of $A_D$ (i) into Equation (2), leads to proposed update rule. Finally, it is possible to prove that the algorithm strictly improves the utility in each iteration until it converges to the solution.

Simulation Results

Figure 3:
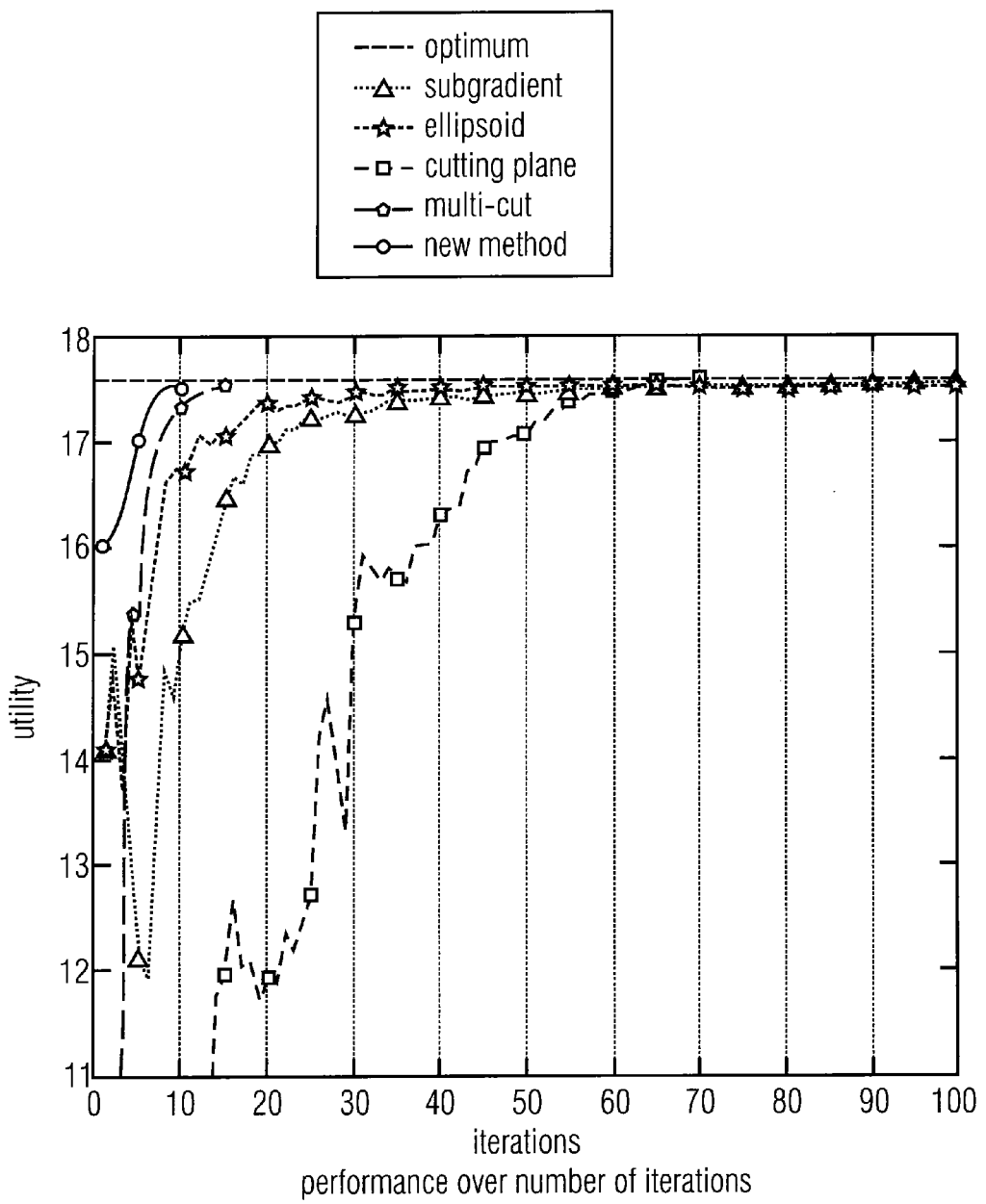
FIG. 3 illustrates a performance of the present invention compared to conventional methods over a number of iterations.

FIG. 3 shows the utility over iterations for one channel realization. Here one can verify the convergence performances. The Aitken process necessitates careful stepsize control to ensure stability. This was not possible to achieve in the inventors' experiments. One can see that the proposed method offers the best convergence speed. The Cutting Plane Method has comparable complexity for calculating the updates and one can see an impressive gain by the method. The Multi-Cut Method offers good performance, however having higher complexity than the method in accordance with an embodiment of the invention.

The algorithm is also investigated in a larger network with the fractional reuse scheme. The subgradient, ellipsoid, and cutting-plane algorithm are not applicable for this scenario as the number of iterations becomes too high (1,000-1,000,000). FIG. 7 shows that the method beats the Multi-Cut method by far, while having lower complexity. The number of constraints of the linear program to be solved in the i-th iteration of the Multi-Cut method has (K+1)i constraints, which are more than 7000 in the last iteration. The new approach however in the i-th iteration has i variables in a convex program with one simple constraint. It is noticed that one can reach a configuration close (90%-95%) to the optimum within a few steps, which makes the new method realistic for practical implementation.

Subsequently, the algorithm illustrated in FIG. 6 is discussed in more detail with respect to FIGS. 4A to 4I. When FIG. 4A to FIG. 4I are considered, it is to be noted that in order to have a full consistence, parameter c is replaced in FIGS. 4A to 4I by parameter r. However, both c and r mean the same, i.e., the resources allocation result. Specifically, $r_m$ or $c_m$ indicate the resources allocation result for the specific user m of the group of users under consideration. Hence, $r_m$ or $c_m$ could be a transmission rate for user m, a frequency channel for user m, a time slot for user m, a code slot for user m or a spatial channel for user m. Additionally, the iteration resource weights λ are associated with each user so that each user resource allocation result $r_m$ has an associated $\lambda_m$. Furthermore, however, m* is a weighting factor for a certain user m used in the weighted combination of the resource allocation result for the iteration step and for at least one earlier iteration step.

Figure 4A:
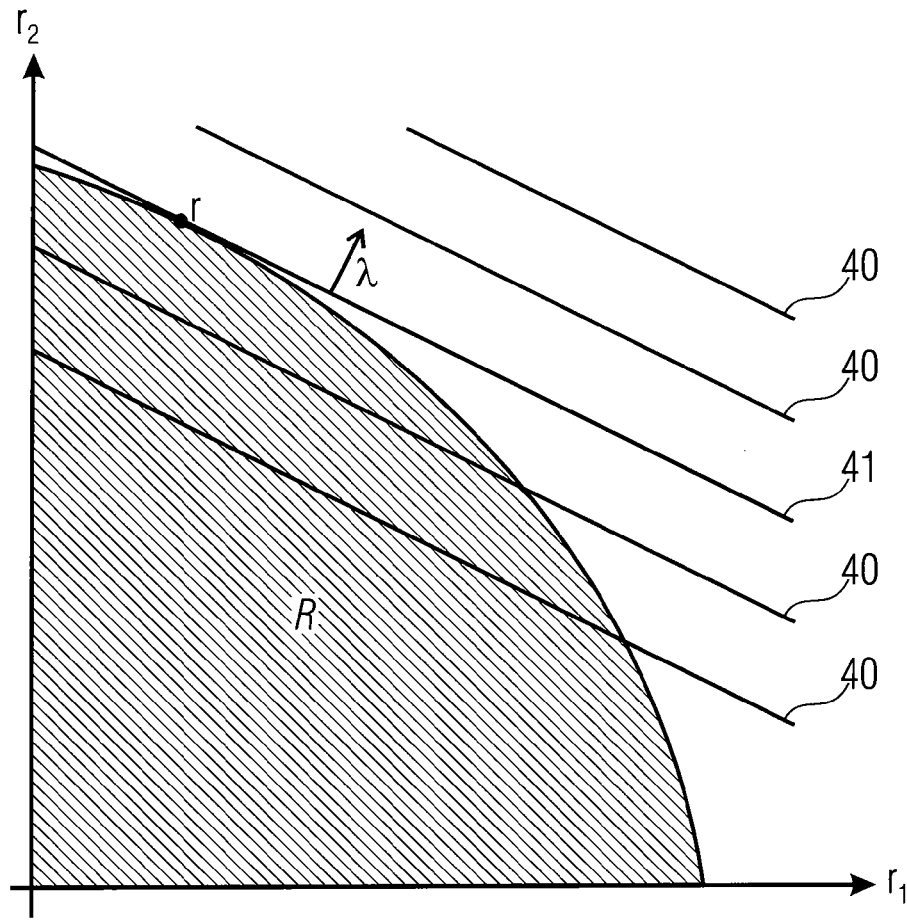
FIGS. 4A to 4I illustrate an iterative algorithm for allocating resources in a 4A-4I graphical representation.
Figure 4B:
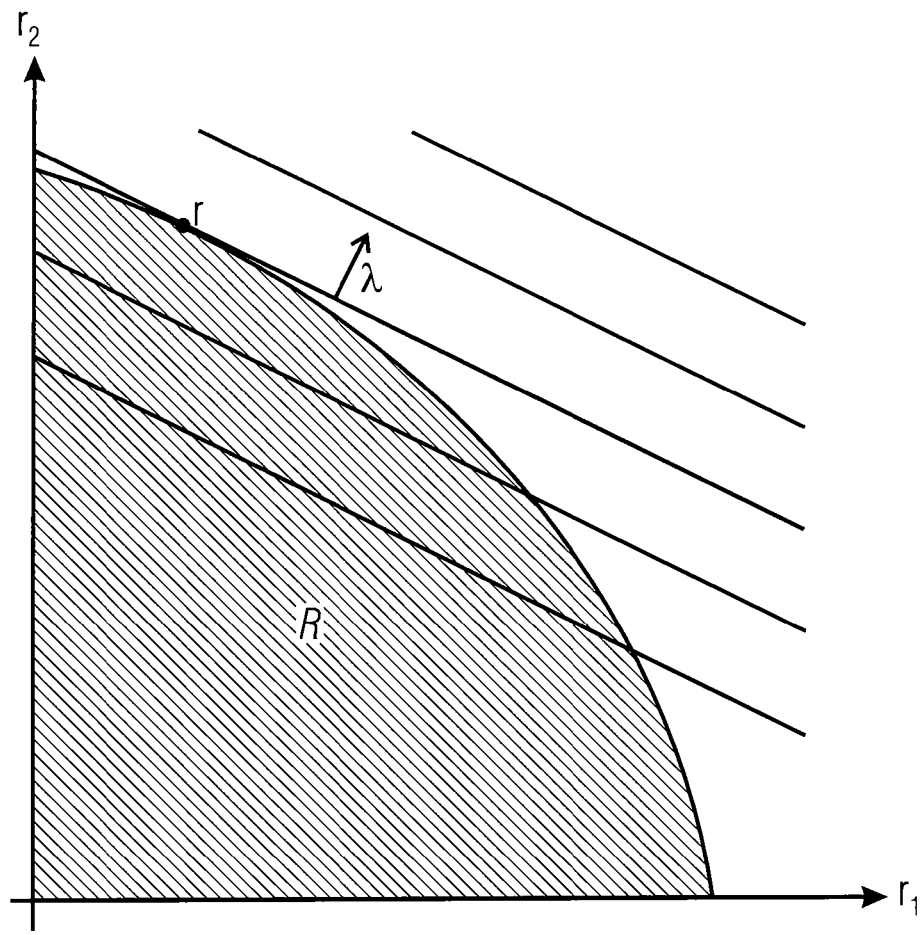

FIG. 4A illustrates a weighted sum-rate maximization (WSRMax) which can be used to find the point on the boundary of R, where R is the so-called achievable rate region R which is a representation of all the physical parameters and transmission channels etc. A product of λ multiplied by r is to be maximized subject to the fact that the rates are within the admissible rate region. As can be seen in FIG. 4A, there exist straight lines 40, where the specific straight line 41 touches the rate region at a certain point and the vector defined by the iteration resource weights λ is orthogonal to line 41. FIG. 4B illustrates the iterative algorithm in a slightly different representation compared to FIG. 6. Specifically, the update step 2 is indicated which is performed subsequent to the weighted sum rate maximization with λ as an argument. Specifically, FIG. 4B illustrates an iterative exploration of the rate region and the cost per iteration are given by the optimization problem, WSRMax and the necessitated signaling among all transmitters when updating λ. The main goal is to drastically reduce the number of iterations.

Figure 4C:
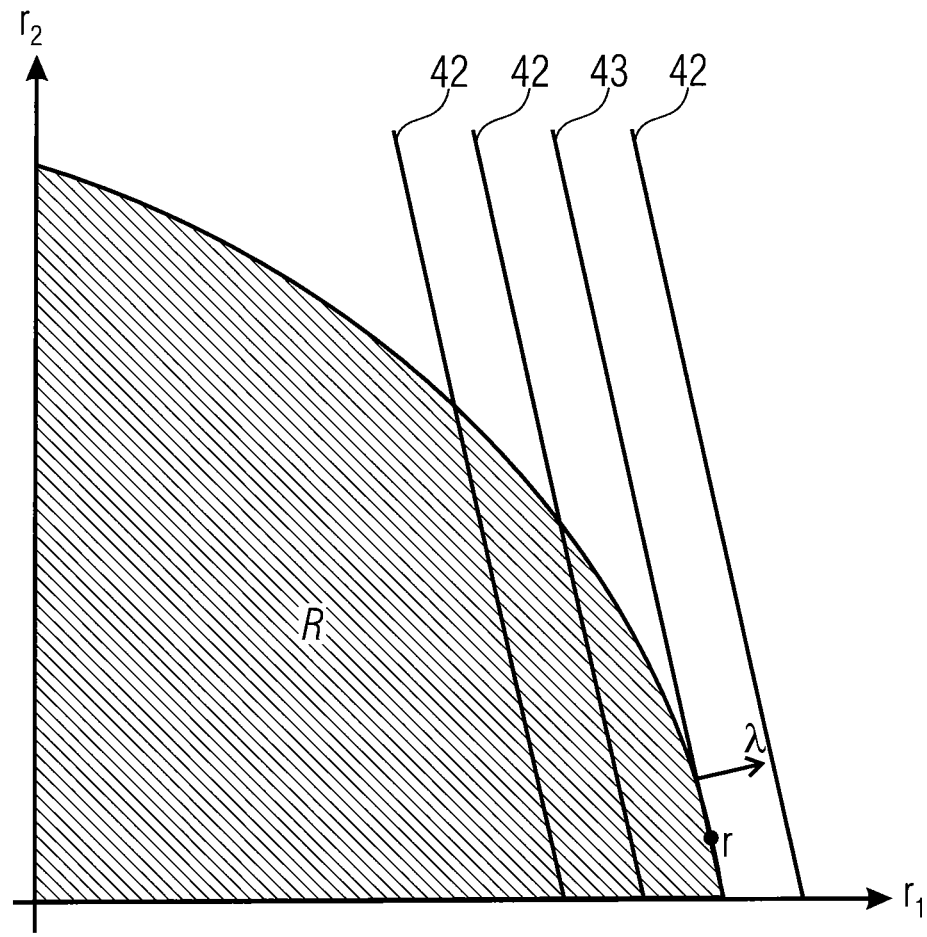

FIG. 4C illustrates another iterative exploration of the rate region where the different lines 42 have a different inclination with respect to FIG. 4A and where line 43 touches the rate region border at the resources allocation result r and λ is again orthogonal to the line 43.

Figure 4D:
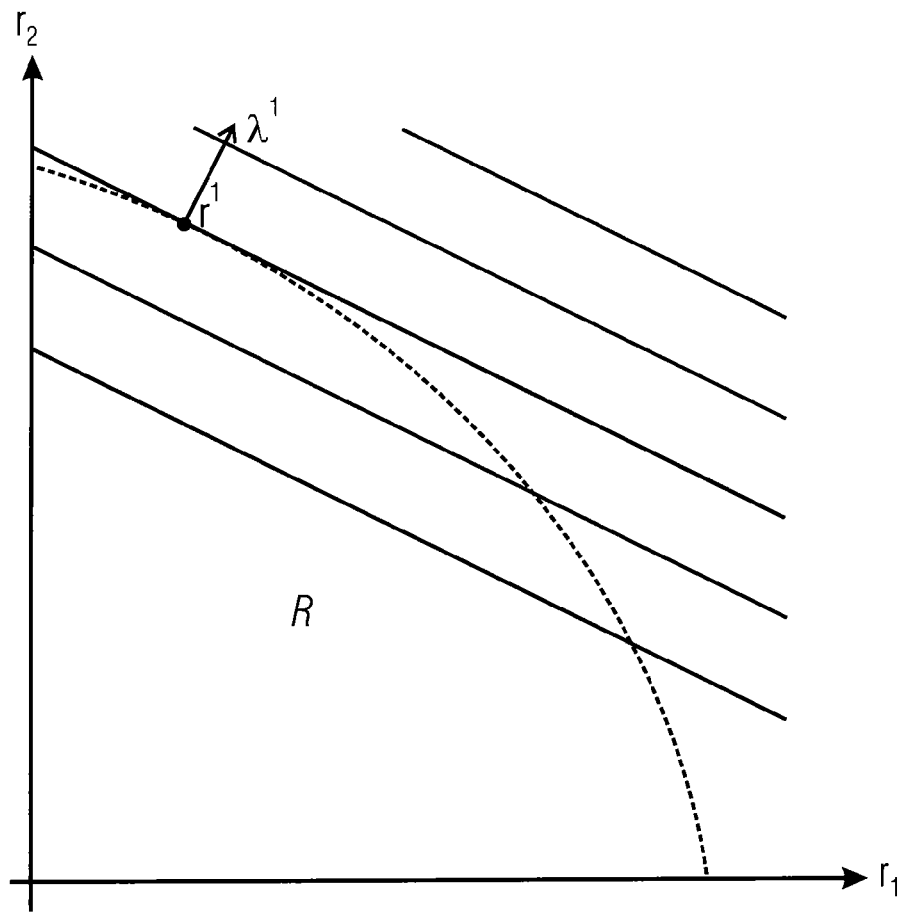
Figure 4E:
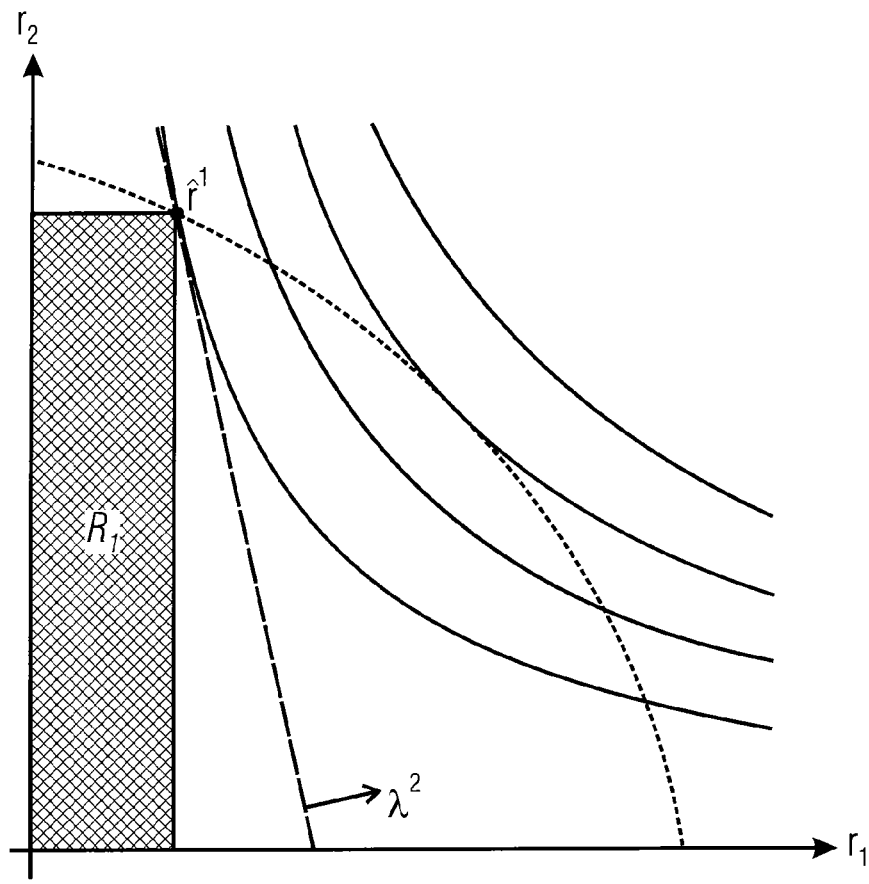
Figure 4F:
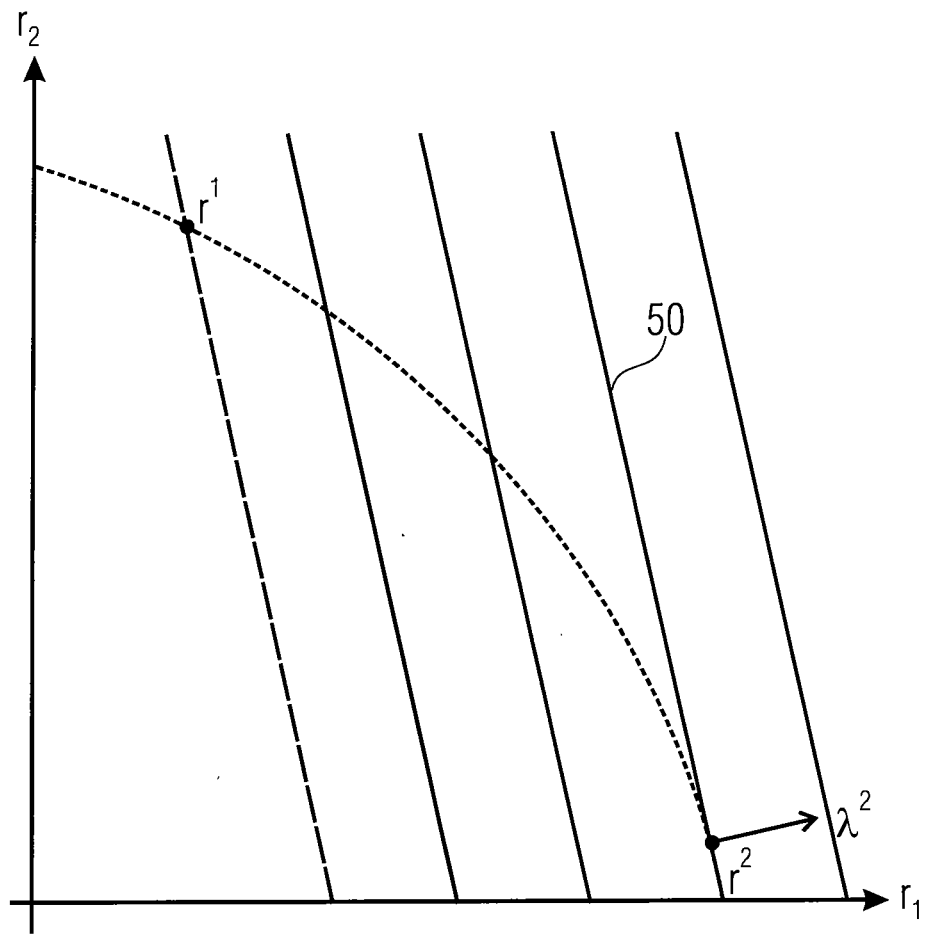
Figure 4G:
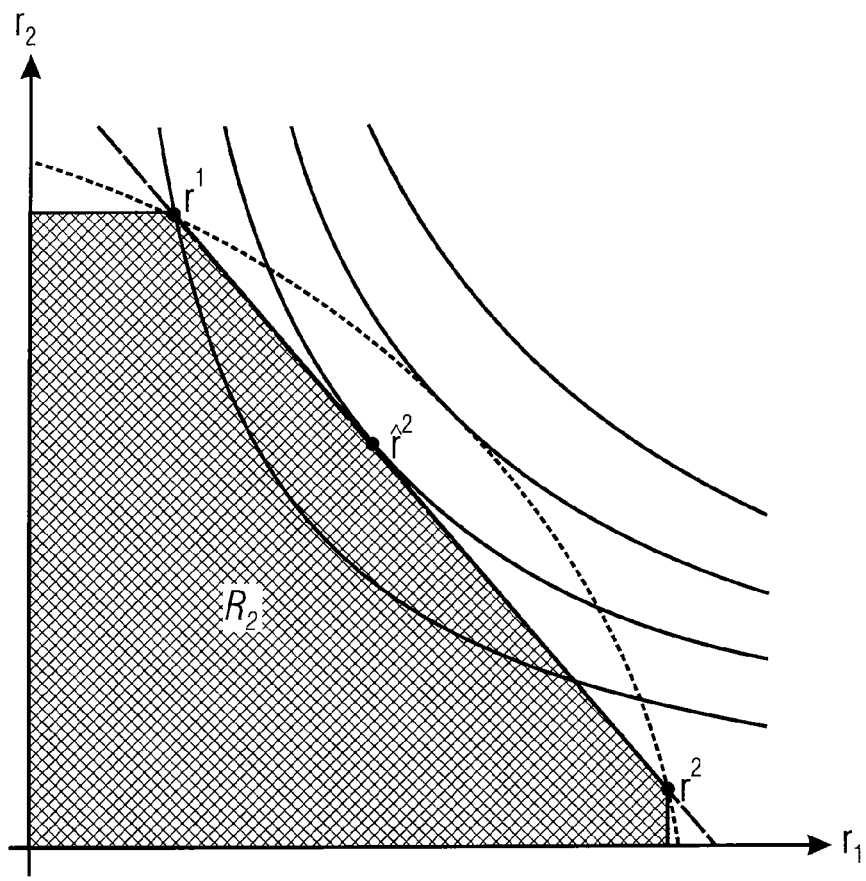

FIG. 4D illustrates a first iteration step with a weighted sum-rate optimization. Here, the rate region is again indicated and the first iteration result is found at r1 having associated update weights $\lambda^1$. Now, as illustrated in FIG. 4E, an inner approximation of the rate region is performed. The update step is illustrated in FIG. 4E. Now, in FIG. 4F, iteration 2 is performed, but now with the different λ calculated in FIG. 4E which means that the point where the line 50 touches the rate region R is determined, and this point corresponds to $r^2$. Now, as illustrated in FIG. 4G, again an inner approximation of the rate region is performed, and in iteration 2, $r^2$ is calculated as a weighted combination of $r^1$ and $r^2$ as determined in the two earlier iteration steps, and this $r^2$ is now used to finally calculate the new $\lambda^3$ so that the λ-update is based on the weighted combination of the resources allocation results for the iteration step and for at least one earlier iteration step.

Figure 4H:
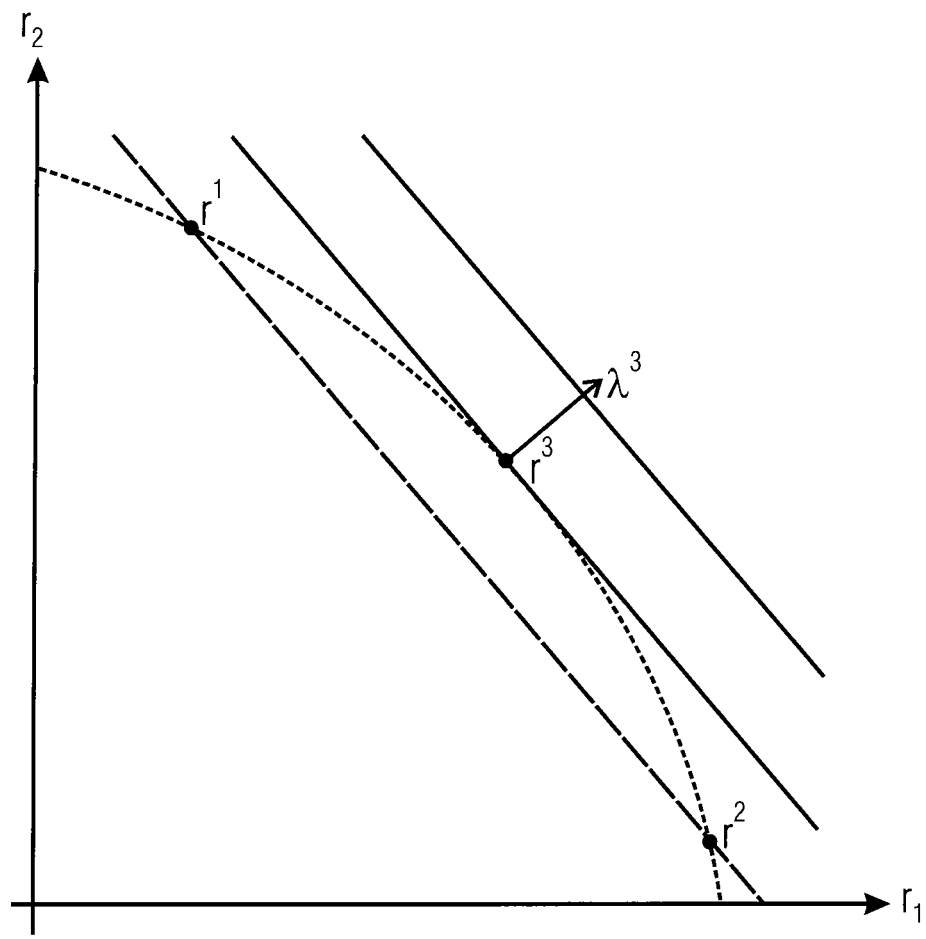
Figure 4I:
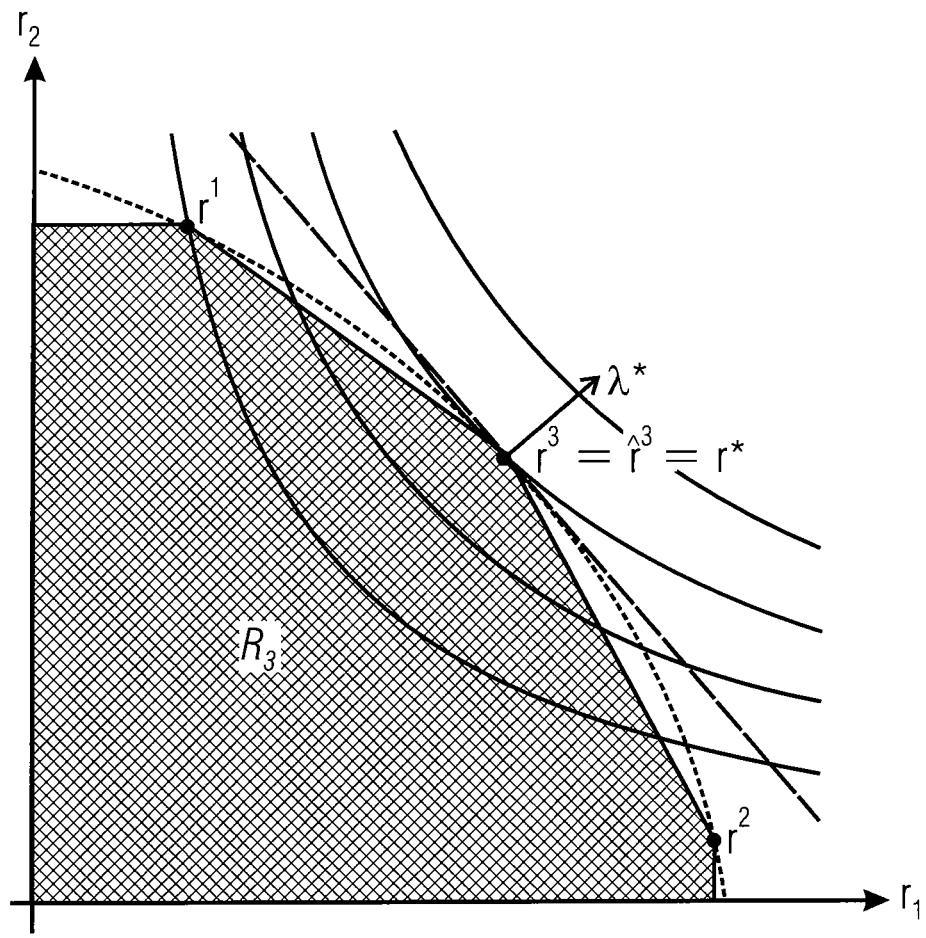

Now, as illustrated in FIG. 4H, iteration 3 results in $r^3$. Stated differently, $\lambda^3$ is calculated in FIG. 4G and the point where a line having an inclination determined by $\lambda^3$ touches the rate region is determined in FIG. 4H. Hence, the result of the third iteration is $r^3$. As illustrated in FIG. 4I, the iteration is now completed, since no improved result can be obtained.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital or non-transitory storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for allocating resources to nodes in a communication system, comprising:

an iteration controller for performing an iterative processing comprising a plurality of successive iteration steps, wherein the iteration controller is configured:

for using iteration resource weights to acquire a resources allocation result for an iteration step of the plurality of successive iteration steps, and for updating the iteration resource weights to acquire updated iteration resource weights for a further iteration step using a weighted combination of the resources allocation results for the iteration step and for at least one earlier iteration step comprising calculating, in the iteration step, a new combination weight based on an optimization of a weighted sum of the resources allocation results of the at least one earlier iteration step multiplied by a combination weight of the at least one earlier iteration step and the resources allocation result of the iteration step multiplied by the new combination weight, under the condition that a combination of the new combination weight and the combination weight of the at least one earlier iteration step is equal to a predefined constraint value.

2. Apparatus according to claim 1, in which the iteration controller is configured for determining the resources allocation result for the iteration step based on an optimization of the weighted sum of the individual resources, where the iteration resource weights are the weights for the individual resources, and where the optimization is performed using an optimization target and a resource region defined by a condition of the communication system or the nodes.

3. Apparatus in accordance with claim 2, in which the condition of the communication system or the nodes comprises a transmission channel between a node and a receiver, transmission power constraints of the nodes, mutual interference between the nodes, physical layer constraints or transmission protocols.

4. Apparatus in accordance with claim 1, in which the resources are transmission rates, frequency channels, time slots, code slots or spatial channels.

5. Apparatus in accordance with claim 1, further comprising:

a memory for storing the resources allocation results acquired in earlier iteration steps up to a current iteration step, and for storing combination weights for the weighted combination from earlier iteration steps up to the current iteration step.

6. Apparatus in accordance with claim 1, further comprising:

an input interface for receiving information on a resource region defined by a condition of the communication system or nodes; and an output interface for outputting the resources allocation result of a final iteration step performed by the iteration controller, so that the nodes are configurable using the resources allocation result of the final iteration step.

7. Apparatus in accordance with claim 1, in which the iteration controller is configured to perform a new linearization of a resource region in each iteration step for acquiring the resources allocation result.

8. Apparatus in accordance with claim 1, in which the iteration controller is configured for maximizing a function $\lambda^T r$ under the constraint that r is within the resource region within the performing an iterative processing to acquire the resources allocation result, wherein $\lambda$ is a vector comprising the iteration resource weights for the nodes, and wherein r is a vector comprising the resources allocation result for the nodes.

9. Apparatus in accordance with claim 1, in which the iteration controller is configured for calculating, within the performing an iterative processing, a new combined weight α for the weighted combination by maximizing a function $$A_D(i): \underset{\alpha \geq 0}{\text{maximize}}$$

$$A_D(i): \underset{\alpha \geq 0}{\text{maximize}} \sum_{k \in K} \log\left(\sum_{m=1}^{i} \alpha_m e_k^T r_m^*\right)$$

under the following constraint, $$\sum_{m=1}^{i} \alpha_m = 1$$

wherein $\alpha_i$ is a weight for the weighted combination for a node m in an iteration step i, wherein $r_i$ is the resources allocation result in an iteration step i, wherein e is an unity vector for selecting a component of the resources allocation result for a user k in the set of users K, and wherein m is a summation parameter.

10. Apparatus in accordance with claim 1, in which the iteration controller is configured to update, within the performing an iterative processing, the iteration resource weights based on the following equation:

$$\left(\sum_{m=1}^{i} \alpha_m e_k^T r_m^*\right)^{-1}$$

wherein $\alpha_i$ is a weight for the weighted combination for a node m in an iteration step i, wherein $r_i$ is the resources allocation result in an iteration step i, wherein e is an unity vector for selecting a component of the resources allocation result for a user k in the set of users K, and wherein m is a summation parameter.

11. Apparatus in accordance with claim 1, wherein the nodes are mobile terminals, wherein the system comprises base stations, and wherein the apparatus for allocating is configured for providing the resources allocation result of the final iteration step to the base stations.

12. Communication system comprising:
an apparatus for allocating resources to nodes in a communication system, the apparatus comprising:
an iteration controller for performing an iterative processing,
wherein the iteration controller is configured:
for using iteration resource weights to acquire a resources allocation result for an iteration step, and
for updating the iteration resource weights to acquire updated iteration resource weights for a further iteration step using a weighted combination of the resources allocation results for the iteration step and for at least one earlier iteration step the updating comprising calculating, in the iteration step, a new combination weight based on an optimization of a weighted sum of the resources allocation results of the at least one earlier iteration step multiplied by a combination weight of the at least one earlier iteration step and the resources allocation result of the iteration step multiplied by the new combination weight, under the condition that a combination of the new combination weight and the combination weight of the at least one earlier iteration step is equal to a predefined constraint value;
nodes being mobile terminals; and
base stations,
wherein the mobile terminals or the base stations comprise multiple antennas to implement spatial channels.

13. Method for allocating resources to nodes in a communication system, comprising:
performing, by an iteration controller, an iterative processing using a plurality of successive iteration steps;
wherein
within an iteration step of the plurality of successive iteration steps, iteration resource weights are used to acquire a resources allocation result for the iteration step, and
within the iteration step, the iteration resource weights are updated to acquire updated iteration resource weights for a further iteration step in the plurality of successive iteration steps using a weighted combination of the resources allocation results for the iteration step and for at least one earlier iteration step, the updating comprising calculating, in the iteration step, a new combination weight based on an optimization of a weighted sum of the resources allocation results of the at least one earlier iteration step multiplied by a combination weight of the at least one earlier iteration step and the resources allocation result of the iteration step multiplied by the new combination weight, under the condition that a combination of the new combination weight and the combination weight of the at least one earlier iteration step is equal to a predefined constraint value,
wherein the iteration controller comprises a hardware implementation.

14. A non-transitory storage medium having stored thereon a computer program for performing, when running on a computer or processor, a method for allocating resources to nodes in a communication system, the method comprising:
performing an iterative processing using a plurality of successive iteration steps;
wherein
within an iteration step of the plurality of successive iteration steps, iteration resource weights are used to acquire a resources allocation result for the iteration step, and
within the iteration step, the iteration resource weights are updated to acquire updated iteration resource weights for a further iteration step in the plurality of successive iteration steps using a weighted combination of the resources allocation results for the iteration step and for at least one earlier iteration step the updating comprising calculating, in the iteration step, a new combination weight based on an optimization of a weighted sum of the resources allocation results of the at least one earlier iteration step multiplied by a combination weight of the at least one earlier iteration step and the resources allocation result of the iteration step multiplied by the new combination weight, under the condition that a combination of the new combination weight and the combination weight of the at least one earlier iteration step is equal to a predefined constraint value.

* * * * *